Oct. 10, 1961 W. J. HAESSLY 3,004,094
METHOD OF MAKING UNIT WAFER CELLS
Filed June 3, 1958
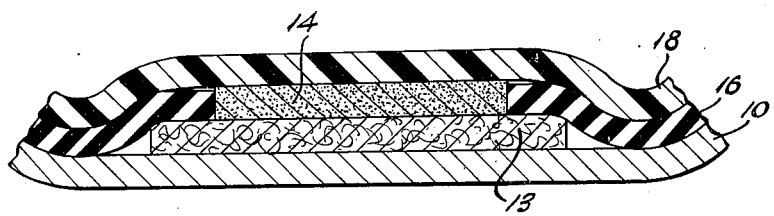
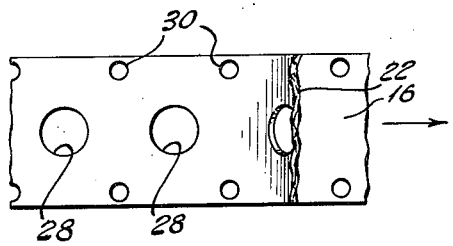
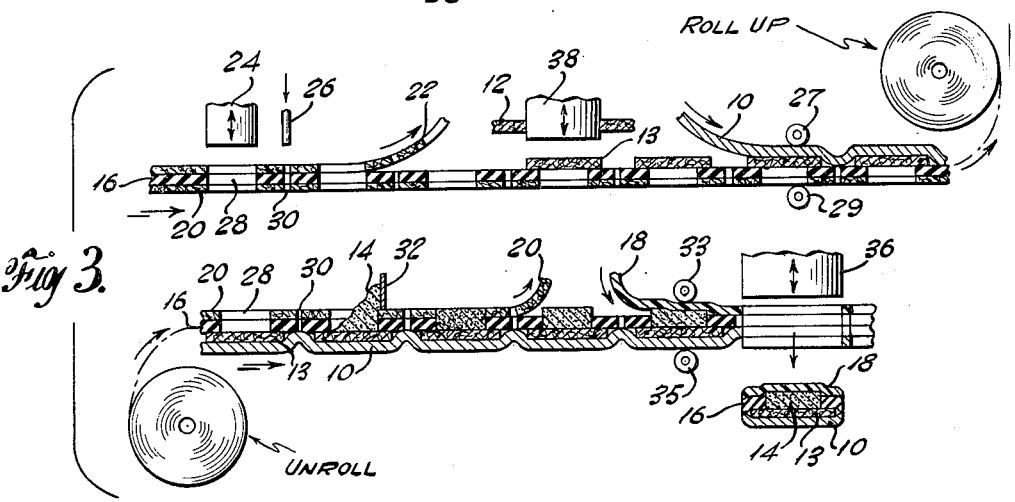
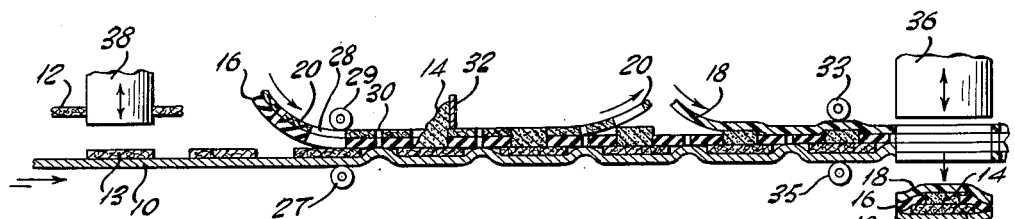
Fig. 4.
INVENTOR.
WILLIAM J. HAESSLY
BY
John F. Hohmann
ATTORNEY

United States Patent Office 3,004,094
Patented Oct. 10, 1961

---

3,004,094
METHOD OF MAKING UNIT WAFER CELLS
William J. Haessly, Cleveland, Ohio, assignor to Union Carbide Corporation, a corporation of New York
Filed June 3, 1958, Ser. No. 739,620
8 Claims. (Cl. 136—175)

This invention relates to a method of making unit primary galvanic wafer cells and more particularly relates to a new and improved method of incorporating cathode-depolarizer mix in such wafer cells.

As the science of electronics has grown to include applications unknown only a short time ago, there has been a constant striving to reduce the size of equipment. Along with equipment miniaturization, the size of electric batteries has had to be drastically reduced to comply with the size requirements which have been placed on the electronic equipment which the battery is to power. In addition to the trend toward miniaturization of electronic gear, new types of galvanic systems have been devised to meet particular needs and most of these do a very good job in the particular applications for which they are meant. The unit cell, that is one which is in itself a complete package of electricity which may be used as such, has a great many advantageous features over other types, such as the two half cell, duplex electrode type of battery and because of these advantages is gaining popularity. One of the reasons for this is that the duplex electrode type of system must, by its very nature, be used in a series battery arrangement, while the unit cell may be used individually or in a series, parallel, or series-parallel battery. Further, each unit cell may be tested before it is stacked to form a battery and individual cells may be rejected if they are defective rather than discarding an entire battery stack. In the case of the duplex electrode type of system, the cells must be stacked to form a battery in order to produce galvanic action and as it is not possible to test the cells individually, the battery must be tested and if found defective must be discarded.

In manufacturing unit primary galvanic cells of the wafer type, one of the more serious problems which has been encountered is the accurate placement of the proper quantity of cathode-depolarizer mix in the cell. Because of the extremely small size of the unit cells which are being dealt with, very accurate placement of all cell elements, including the depolarizer mix, must be accomplished to minimize short circuiting which would be the result of misaligned cell elements.

It is therefore the primary object of this invention to provide a method of manufacturing a unit primary galvanic cell wherein all cell elements are accurately positioned with respect to each other. It is another object of this invention to provide a method of incorporating cathode-depolarizer mix into a unit primary galvanic cell in the proper amount and accurately positioned.

These objects and the method of this invention will be best understood with reference to the accompanying drawing in which:

FIG. 1 is an elevation in section of a unit wafer cell made by the method of this invention;

FIG. 2 is a plan view of a laminate for use in conjunction with this invention;

FIG. 3 is a schematic representation of one method by which this invention may be carried out; and FIG. 4 is similar to FIG. 3 showing a modified method according to this invention.

This invention comprises the provision of a laminate, composed of a masking shield and an insulating film having an aperture therein, adjacent an anode, incorporating a separator between the anode and the insulating film side of the laminate in such position that access may be had to the separator through the aperture and so that the anode is still in contact with the insulating film, filling the aperture with cathode-depolarizer mix, removing the masking shield and adhering a cathode-collector, over said depolarizer mix, to said insulating film. The galvanic action of this cell is produced between the anode and the cathode-depolarizer mix and it is a unit cell since the insulating film separates the anode from the cathode-collector.

In greater detail and with reference to the accompanying drawing, a unit primary galvanic cell, as best shown in FIG. 1, comprises an anode 10 having a separator 13 adjacent one face, depolarizer mix 14 adjacent to the separator 13, an insulation ring 16 surrounding the depolarizer mix 14 and preferably adhered to the anode 10 around the separator 13, and a flexible cathode collector 18 adhered to the insulation 16 and covering the depolarizer mix 14.

In the preferred form of this invention, a laminate for use in making a unit cell of the type described above is constructed as illustrated in FIG. 2. This laminate is preferably made by the method shown in FIG. 3 to wit; a continuous strip of insulating film 16 has continuous strips of masking shield 20 and 22 adhered to each side thereof to form the laminate. The laminate is provided with apertures 28, by an aperture punch 24, and with registry holes 30, near the outer edge of the laminate, by a registry hole punch 26. One of the masking shields 22 is removed as shown in FIG. 3, and a strip of separator material 12 is blanked, by a punch 38, the blanked separator 13 covering one end of the aperture 28. The anode 10 is then provided adjacent the separator 13 and the insulating film 16, and is adhered thereto through pressure exerted by a pair of rollers 27 and 29. The web, consisting of the strip of insulating film 16, of masking shield 20 and anode material 10, is rather thin and flexible, and after adhering the anode, it is rolled up, turned over, and then unrolled to expose the other masking shield 20 to the remainder of the operations.

The apertures 28 are filled with depolarizer mix 14 to the top of the masking shield 20 by conventional means, suitably a knife edge 32, and the masking shield 20 is removed. A strip of cathode-collector material 18 is provided over the depolarizer mix 14 and adjacent the insulating film 16, and the completed cells are compressed by means of a pair of rolls 33 and 35. All the components of the unit cell are thus in place and the cells are cut out by means of a punch 36 and may be used individually or preferably are stacked to form a battery.

This method may be modified as shown in FIG. 4 by providing the separator 13 blanked by a punch 38 from a strip of separator material 12 and placed on an anode 10, adhering a masking shield 20 to an insulating film 16, to form a laminate, punching apertures 28 and registry holes 30 in the laminate as shown in FIG. 2, joining the insulator 16 to the anode 10 around the separator 13, compressing the joined anode by a pair of rolls 27 and 29, filling the apertures 28 with depolarizer mix 14 by conventional means, suitably a knife edge 32, removing the masking shield 20, adhering a strip of cathode-collector material 18 over the depolarizer mix 14, to the insulator 16, compressing the completed cell by means of a pair of rollers 33 and 35, and cutting out the cells thus formed to be used individually or in battery stacks.

It is advantageous to so position the registry holes 30 that they overlap the anode 10 and the separator 13. By so positioning them, it becomes practical to link the registry holes 30, through conventional means such as sprockets and gear trains, to the cell cut out punch 36 and the separator punch 38 in order that accurate placement of all components and proper cutting out of the finished cells be accomplished.

It is not necessary for the practice of this invention that a single line of cells be produced and it is only so shown in the accompanying drawing for simplicity. The anode may be of any width desired so as to correspond to the number of lines of cells to be produced from a single strip. It is further to be noted that while the masking film 20 may be a single continuous strip, and as such may be used to advantage in the practice of this invention, it is preferred to apply it in the form of three longitudinal sections which may suitably be joined by discontinuous slits or perforations, but which are preferably not joined at all. When employing the masking film 20 in longitudinal section form, the central section contains the apertures 28 and should be of a width less than the width of the anode strip 10. The marginal sections, which contain the registry holes 30 as referred to above, should overlap the anode strip 10.

As a specific example of the practice of this invention, primary galvanic cells of the Leclanché system were made utilizing a strip of polyester film 2 inches wide as the insulating film. This insulating film was coated on both sides thereof with a pressure sensitive rubber base adhesive and masking shields were adhered to the insulating film, by means of the adhesive, to form a laminate. Apertures, each 3/16 inch in diameter, were punched in the center 1 1/16 inch of the laminate 4 abreast, and registry holes were punched near the outer edge of the laminate. One of the masking films was removed and a methylcellulose coated paper strip, soaked in zinc chloride-ammonium chloride electrolyte solution and blanked to form separators 1/4 inch in diameter, was blanked over the end of each aperture, adhering to the insulating film because of the adhesive left behind when the masking shield was removed. A strip of zinc anode 1 5/16 inch wide was placed over the separators and adhered to the insulating film by the remainder of the adhesive. The insulating film, with the anode strip provided thereto, was then rolled up, turned over and unrolled exposing the other masking shield to the subsequent operations.

The apertures were filled with a manganese dioxide cathode-depolarizer slurry, by means of a knife edge, to the top of the second masking shield which was then removed. A strip of vinyl film, which was impregnated with sufficient carbon to render it conductive, was applied over the exposed cathode-depolarizer and adhered to the insulation film by means of the adhesive left behind when the second masking film was removed. The composite strip of material which then had all the cell elements placed thereon was then forced through calender rolls and the individual cells were cut out, tested for misalignment and the good ones stacked to form batteries.

The registry holes, which resembled sprocket holes in the edge of moving picture film, were connected by a gear train to the separator blanking punch so as to make sure that the separators were so deposited that each would cover one aperture completely and to ascertain that each aperture would be provided with a separator. The registry holes were further geared to the cell cut out punch so as to provide accurate cutting out of each cell as it was assembled. While this specific example has described the manufacture of unit cells of the Leclanché system, the method of this invention is by no means limited to use in making cells of this type and is adapted to manufacture of any primary galvanic unit cell of the wafer variety. For example, cells employing magnesium, aluminum, manganese or other anode materials with the appropriate electrolyte may be made according to this invention.

What is claimed is:

1. A method of manufacturing a unit primary galvanic wafer cell comprising adhering a laminate composed of an insulating film and a masking shield, having an aperture therein, to an anode, providing a separator between said anode and said insulating film in such position as to provide access thereto through said aperture, filling said aperture with cathode-depolarizer mix, removing said masking shield, covering said depolarizer mix with a cathode-collector, and compressing said cell thereby providing intimate contact of all elements thereof, said insulating film separating said anode and said cathode-collector.

2. A method of manufacturing a unit primary galvanic wafer cell comprising providing a laminate composed of an insulating film between two layers of masking shield, forming an aperture in said laminate, removing one masking shield therefrom, positioning a separator adjacent an anode, adhering said insulating film to said anode in such position as to provide access through said aperture to said separator, filling said aperture with cathode-depolarizer mix, removing the other masking shield, covering said depolarizer mix with a cathode-collector, and compressing said cell thereby providing intimate contact of all elements thereof, said insulating film separating said anode from said cathode-collector, each being adhered thereto.

3. A method of continuously manufacturing unit primary galvanic wafer cells which comprises providing a laminate, composed of a continuous strip of insulating film and at least one continuous strip of masking shield, with apertures in the center thereof spaced therein at regular intervals and smaller registry holes near the edges thereof spaced therein at regular intervals, adhering said insulating film to an anode, positioning separators between said anode and said insulating film in such position as to provide access thereto through said apertures, filling said apertures with cathode-depolarizer mix, removing said masking shield, covering said depolarizer mix-filled apertures with a continuous strip of cathode-collector, compressing the assembly thus formed thereby providing intimate contact of all elements thereof, and cutting out unit cells from the assembly, said insulating film separating said anode from said cathode-collector, each being adhered thereto.

4. A method of continuously manufacturing unit primary galvanic wafer cells which comprises providing a laminate, composed of a continuous strip of insulating film between two continuous layers of masking shield, with apertures therein spaced at regular intervals and smaller registry holes spaced therein at regular intervals near the edges of said laminate, removing one masking shield, adhering a continuous strip of anode to said insulating film, positioning separators between said anode and said insulating film in such position as to provide access thereto through said apertures, said anode being of a width less than the distance between said registry holes, filling said apertures with cathode-depolarizer mix, removing the other masking shield, covering said depolarizer mix-filled apertures with a continuous strip of cathode-collector, compressing the assembly thus formed thereby providing intimate contact of all elements thereof, and cutting out unit cells from the assembly, said insulating film separating said anode from said cathode-collector, each being adhered thereto.

5. A method of continuously manufacturing unit primary galvanic cells which comprises providing a laminate, composed of a continuous strip of masking shield and a continuous insulating film, with apertures in the center thereof spaced therein at regular intervals and smaller registry holes spaced at regular intervals near the edges thereof, blanking separator disks of a diameter slightly larger than the diameter of said apertures, placing said disks at regular intervals on an anode strip, positioning said insulating film side of said laminate adjacent said separator disks, so as to provide access to said disks through said apertures, adhering said anode to said insulating film around said disks, filling said apertures with cathode-depolarizer mix, removing said masking shield, covering said depolarizer mix-filled apertures with a continuous strip of cathode-collector, and cutting out the cells thus formed, said insulating film separating said cathode-collector from said anode.

6. In the method of manufacturing a unit primary galvanic wafer cell which method comprises providing a separator between an anode and cathode-depolarizer mix, covering said cathode-depolarizer mix with a cathode-collector, and placing an insulating film around said cathode-depolarizer mix between said anode and said cathode-collector; the improvement comprising providing a laminate, composed of a masking shield and said insulating film, with an aperture therein, positioning said separator adjacent said insulating film so as to provide access thereto through said aperture, filling said aperture with said depolarizer mix, removing said masking shield, covering said depolarizer mix with said cathode-collector, and compressing said cell thereby providing intimate contact of all elements thereof.

7. In the method of manufacturing a unit primary galvanic wafer cell which method comprises providing a separator between an anode and cathode-depolarizer mix, covering said cathode-depolarizer mix with a cathode-collector, and placing an insulating film around said cathode-depolarizer mix between said anode and said cathode-collector; the improvement comprising providing a laminate composed of an insulating film between two masking shields, punching an aperture therein, removing one of said masking shields, positioning said separator adjacent said insulating film so as to provide access thereto through said aperture, filling said aperture with said mix, removing the other masking shield, applying said cathode-collector over said mix adjacent said insulating film, applying said anode over said separator adjacent said insulating film, and compressing said cell thereby providing intimate contact of all elements thereof.

8. In the method of continuously manufacturing unit primary galvanic cells which method comprises providing a multiplicity of separators on a continuous strip of anode, applying cathode-depolarizer mix adjacent said separators, covering said mix with a continuous strip of cathode-collector, placing an insulating film around said mix between said anode and said cathode-collector, and cutting out the cells thus formed; the improvement comprising providing a laminate, composed of a continuous strip of said insulating film between two continuous strips of masking shield, punching a multiplicity of apertures in said laminate spaced at regular intervals, removing one of said masking shields, placing said separators adjacent said insulating film so as to provide access thereto through said apertures, filling said apertures with said cathode-depolarizer mix, removing the other masking shield, covering said mix with a continuous strip of said cathode-collector and compressing the assembly thus formed thereby providing intimate contact of all elements thereof.

References Cited in the file of this patent

UNITED STATES PATENTS

| | | |
|---|---|---|
| 2,666,802 | Woodring et al. | Jan. 19, 1954 |
| 2,844,641 | Lang et al. | July 22, 1958 |
| 2,894,052 | Evans | July 7, 1959 |